United States Patent
Niimoto

(10) Patent No.: US 10,831,425 B2
(45) Date of Patent: *Nov. 10, 2020

(54) IMAGE FORMING APPARATUS THAT PERFORMS NOTIFICATION WHEN LOG INFORMATION REACHES A THRESHOLD WHICH IS LOWER THAN A THRESHOLD THAT NECESSITATES DELETION OF INFORMATION, SERVER APPARATUS, AND INFORMATION PROCESSING SYSTEM

(71) Applicant: CANON KABUSHIKI KAISHA, Tokyo (JP)

(72) Inventor: Keisuke Niimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,463

(22) Filed: Jun. 7, 2019

(65) Prior Publication Data
US 2019/0286399 A1 Sep. 19, 2019

Related U.S. Application Data

(62) Division of application No. 16/018,737, filed on Jun. 26, 2018, now Pat. No. 10,359,980.

(30) Foreign Application Priority Data

Jun. 30, 2017 (JP) .................................. 2017-129167

(51) Int. Cl.
G06F 3/12 (2006.01)
G06F 21/52 (2013.01)

(52) U.S. Cl.
CPC .......... *G06F 3/1274* (2013.01); *G06F 3/1207* (2013.01); *G06F 3/1222* (2013.01); (Continued)

(58) Field of Classification Search
None
See application file for complete search history.

(56) References Cited

U.S. PATENT DOCUMENTS

2006/0085697 A1\* 4/2006 Takeuchi ........... H04N 1/00344
714/50
2008/0074683 A1\* 3/2008 Yanamura .......... H04N 1/00204
358/1.2

(Continued)

FOREIGN PATENT DOCUMENTS

JP 200852390 3/2008
JP 201139720 2/2011

*Primary Examiner* — Miya J Williams
(74) *Attorney, Agent, or Firm* — Venable LLP

(57) ABSTRACT

The image forming apparatus of the present invention is an image forming apparatus that transmits log information, including: a log information generation unit configured to generate the log information in accordance with a job; a storage control unit configured to cause a log information storage unit to store the generated log information; a log information deletion unit configured to delete log information stored in the log information storage unit so that the number of pieces of log information stored in the log information storage unit does not exceed a storage upper limit; and a log loss information addition unit configured to add log loss information to log information to be stored in the log information storage unit in a case where the log information is deleted by the log information deletion unit.

11 Claims, 11 Drawing Sheets

(52) U.S. Cl.
CPC .......... *G06F 3/1273* (2013.01); *G06F 3/1285* (2013.01); *G06F 3/1288* (2013.01); *G06F 21/52* (2013.01)

(56) References Cited

U.S. PATENT DOCUMENTS

| | | |
|---|---|---|
| 2009/0085697 A1 | 4/2009 | Takeuchi |
| 2009/0316200 A1* | 12/2009 | Kubota .............. H04N 1/00344 358/1.15 |
| 2012/0293835 A1* | 11/2012 | Amano .................... G06F 3/121 358/1.15 |
| 2014/0085659 A1* | 3/2014 | Jeong ...................... G06F 11/34 358/1.14 |
| 2014/0293335 A1 | 10/2014 | Kikuchi |
| 2017/0090830 A1* | 3/2017 | Tomono ................ G06F 3/1285 |

* cited by examiner

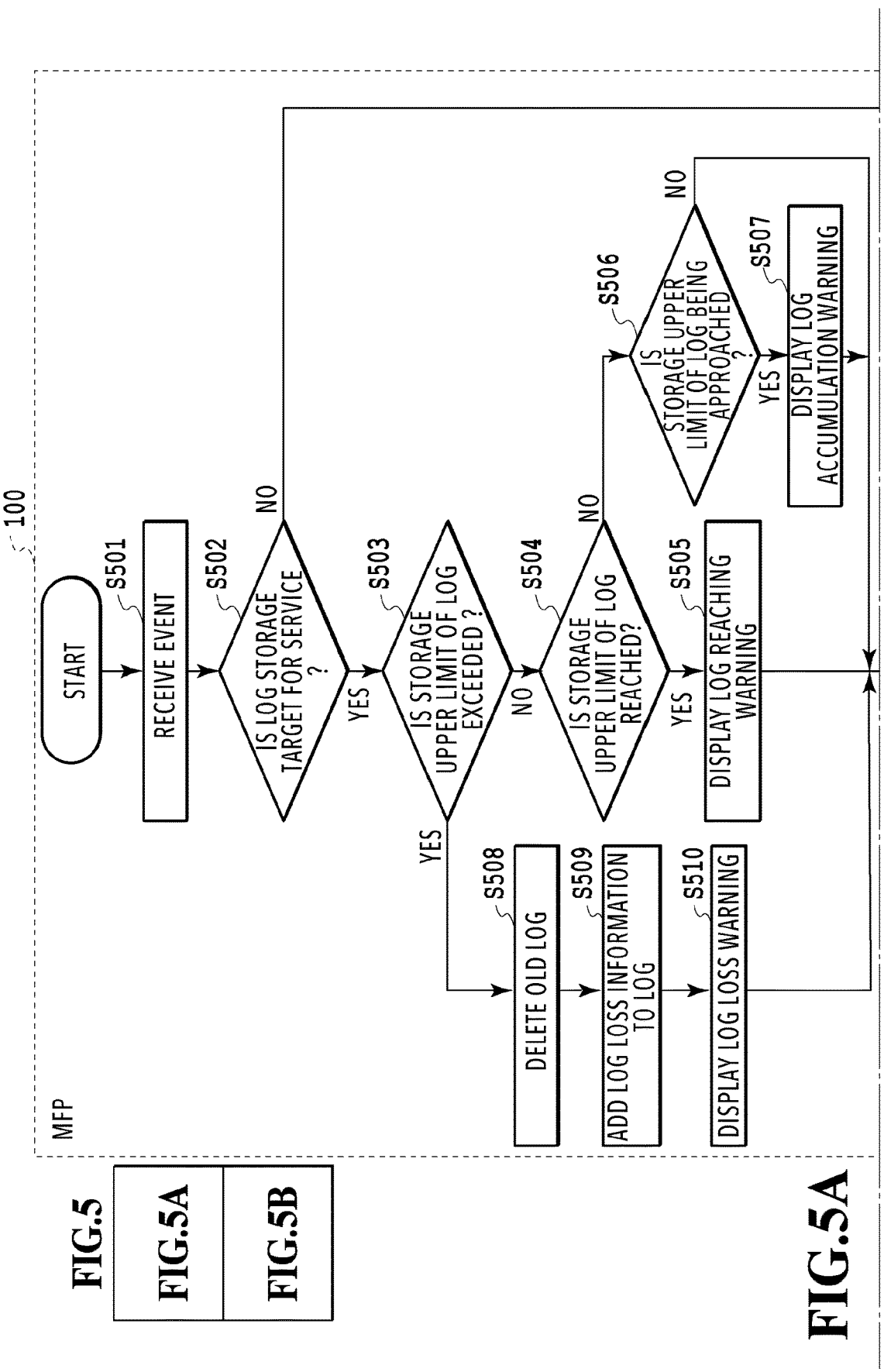

WARNING

ONE HUNDRED LOGS HAVE ACCUMULATED.
IT IS NOT POSSIBLE TO RECEIVE THE SERVICE
USING LOG INFORMATION
SO CHECK THE NETWORK SITUATION OF MFP.

WARNING

ONE HUNDRED EIGHTY LOGS HAVE ACCUMULATED.
IT IS NOT POSSIBLE TO RECEIVE THE SERVICE
USING LOG INFORMATION
SO CHECK THE NETWORK SITUATION OF MFP.

WARNING

TWO HUNDRED LOGS HAVE ACCUMULATED.
LOG INFORMATION WILL BE LOST FROM NOW ON
SO THE SERVICE PROVISION IS IMPEDED.
CHECK THE NETWORK SITUATION OF MFP.

| LOG RECORDING DATE AND TIME | 2010/1/1/12:00 |
|---|---|
| TYPE OF LOG | COLOR COPY |
| NUMBER OF PRINTED SHEETS | ONE |
| SHEET TYPE | GLOSSY PAPER |
| LOG LOSS INFORMATION | NONE |
| REGISTRATION IDENTIFICATION INFORMATION | 12345 |

FIG.8

| LOG RECORDING DATE AND TIME | 2010/1/1/12:00 |
|---|---|
| TYPE OF LOG | COLOR COPY |
| NUMBER OF PRINTED SHEETS | ONE |
| SHEET TYPE | GLOSSY PAPER |
| LOG LOSS INFORMATION | INCLUDED 2009/12/1/11:00 |
| REGISTRATION IDENTIFICATION INFORMATION | 12345 |

FIG.9

| LOG RECORDING DATE AND TIME | 2010/1/1/12:00 |
|---|---|
| TYPE OF LOG | COLOR COPY |
| NUMBER OF PRINTED SHEETS | ONE |
| SHEET TYPE | GLOSSY PAPER |
| LOG LOSS INFORMATION | INCLUDED<br>2009/12/1/11:00<br>PRINT JOB: THREE |
| LOST LOG STATUS — NW STATE | OFF LINE |
| LOST LOG STATUS — NW SETTING | WLAN |
|  | INFRASTRUCTURE |
|  | AP NOT CONNECTED |
| LOST LOG STATUS — SERVER COMMUNICATION RESULTS | NOT COMMUNICATED |
| REGISTRATION IDENTIFICATION INFORMATION | 12345 |

FIG.10A

| LOG RECORDING DATE AND TIME | 2010/1/1/13:00 |
|---|---|
| TYPE OF LOG | SD CORD DIRECT PRINTING |
| NUMBER OF PRINTED SHEETS | TWO |
| SHEET TYPE | PLAIN PAPER |
| LOG LOSS INFORMATION | INCLUDED<br>2009/12/1/11:30<br>PRINT JOB: ONE |
| LOST LOG STATUS — NW STATE | ON LINE |
| LOST LOG STATUS — NW SETTING | WLAN |
|  | INFRASTRUCTURE |
|  | AP CONNECTED |
| LOST LOG STATUS — SERVER COMMUNICATION RESULTS | DURING SERVER MAINTENANCE |
| REGISTRATION IDENTIFICATION INFORMATION | 12345 |

FIG.10B

IMAGE FORMING APPARATUS THAT PERFORMS NOTIFICATION WHEN LOG INFORMATION REACHES A THRESHOLD WHICH IS LOWER THAN A THRESHOLD THAT NECESSITATES DELETION OF INFORMATION, SERVER APPARATUS, AND INFORMATION PROCESSING SYSTEM

CROSS-REFERENCE TO RELATED APPLICATIONS

This application is a Divisional of U.S. patent application Ser. No. 16/018,737, filed Jun. 26, 2018, which claims the benefit of Japanese Application No. 2017-129167 filed Jun. 30, 2017, the entire contents of which are all hereby incorporated by reference herein.

BACKGROUND OF THE INVENTION

Field of the Invention

The present invention relates to an image forming apparatus, a server apparatus, and an information processing system.

Description of the Related Art

In recent years, in a multi function printer (MFP) including a network function, use information on a user and log information, such as a history, are made use of in various services other than an analysis of trouble and a charging system. For example, proposing a new service in accordance with a utilization method of a user by transmitting log information and analyzing the log information, and giving a special favor to a user whose use frequency is high are performed. As described above, making use of log information for a service prompts a use of the main functions, such as print and scan, of the MFP, and therefore, the development thereof is desired also in the future.

However, such an MFP, particularly, an MFP for household use is not necessarily connected to a network at all times and by continuing to use in the off-line state, log information accumulates in the MFP and further, is deleted, and as a result, it is concerned that the service cannot be received.

In order to resolve such concern, for example, Japanese Patent Laid-Open No. 2011-39720 has disclosed a log monitoring program and further, Japanese Patent Laid-Open No. 2008-52390 has disclosed a log recording control method for audit. In the log monitoring program disclosed in Japanese Patent Laid-Open No. 2011-39720, in the case where it is not possible to transmit log information to a server because of disconnection of communication, the log information is stored in a predetermined location. Then, in the case where the size of the log information exceeds a predetermined threshold value, control is performed so that the storage size of the log information does not exceed an upper limit by prohibiting an operation of a user for whom log information is to be acquired. Further, in the log recording control method for audit disclosed in Japanese Patent Laid-Open No. 2008-52390, in the case where the remaining capacity of the storage area to store log information becomes smaller than a predetermined threshold value, control is performed so that a storage upper limit of log information is not exceeded by moving the operation into a reduced operation in which part or all of the functions are limited.

However, with both the technique disclosed in Japanese Patent Laid-Open No. 2011-39720 and the technique disclosed in Japanese Patent Laid-Open No. 2008-52390 described above, because priority is given to storing log information, in the case where the number of pieces of log information approaches the storage upper limit, the use of the main functions, such as print and scan, is limited, and therefore, a reduction in usability results.

SUMMARY OF THE INVENTION

The present invention has been made in view of the conventional problem described above and an object is to prevent a reduction in usability even in the case where the number of pieces of log information approaches a storage upper limit.

In order to fulfill the above-described object, the image forming apparatus of the present invention is an image forming apparatus that transmits log information, including: a log information generation unit configured to generate the log information in accordance with a job; a storage control unit configured to cause a log information storage unit to store the generated log information; a log information deletion unit configured to delete log information stored in the log information storage unit so that a number of pieces of log information stored in the log information storage unit does not exceed a storage upper limit; and a log loss information addition unit configured to add log loss information to log information to be stored in the log information storage unit in a case where the log information is deleted by the log information deletion unit.

Further features of the present invention will become apparent from the following description of exemplary embodiments with reference to the attached drawings.

BRIEF DESCRIPTION OF THE DRAWINGS

FIG. 5 is a diagram showing the relationship of FIG. 5A and FIG. 5B;

FIG. 5A is a sequence diagram showing a procedure of processing of an MFP and a log collection server;

FIG. 6A and FIG. 6B are diagrams showing log accumulation warning screens displayed in the case where the number of pieces of log information is approaching a storage upper limit;

FIG. 7 is a diagram showing a log accumulation warning screen in the case where the number of pieces of log information reaches the storage upper limit;

FIG. 8 is a diagram showing log information not including log loss information;

FIG. 9 is a diagram showing log information including log loss information; and

FIG. 10A and FIG. 10B are diagrams showing log information including log loss information.

DESCRIPTION OF THE EMBODIMENTS

In the following, preferred embodiments of the present invention are explained in detail with reference to the attached drawings. The following embodiments are not intended to limit the present invention and all combinations of features explained in the embodiments are not necessarily indispensable to the solution of the present invention.

Figure 1:
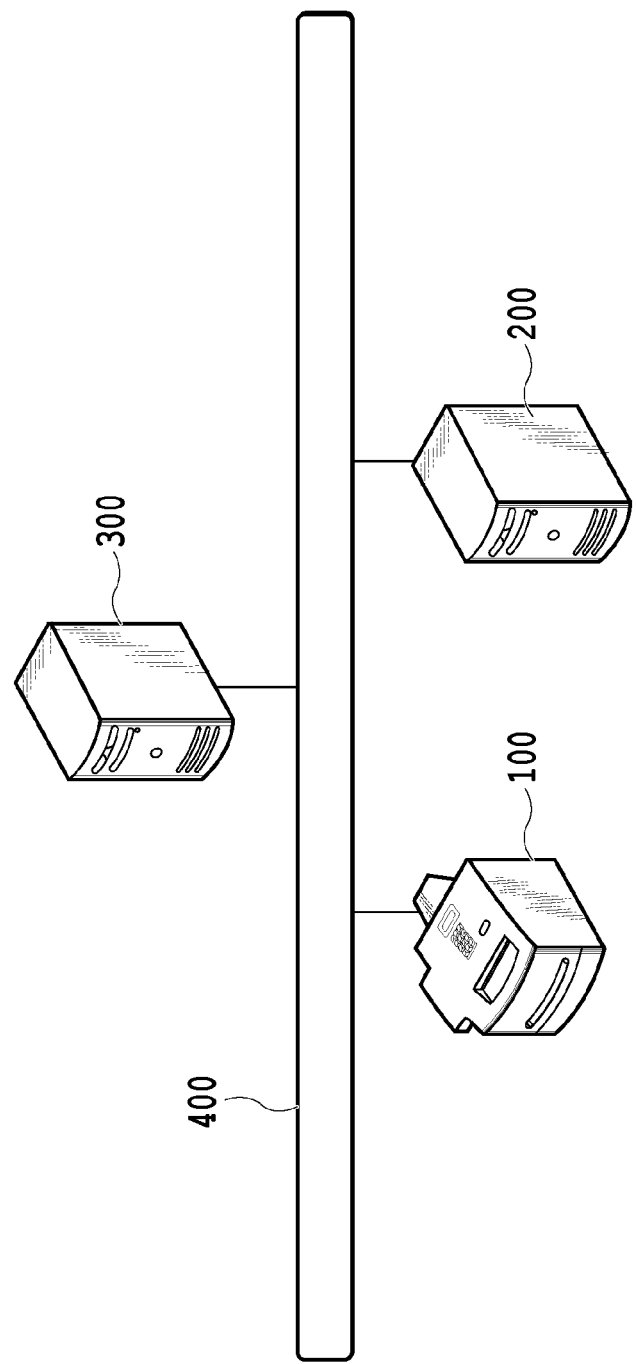
FIG. 1 is a diagram showing a configuration of an information processing system according to an embodiment of the present invention.

FIG. 1 is a block diagram showing a configuration of an information processing system according to the present embodiment. The information processing system includes an MFP (Multi Function Printer) 100, a PC 200, and a log collection server 300 connected via a communication network 400, for example, such as the Internet.

In the case where the MFP 100 is connected to the communication network 400 for the first time, communication is performed between the MFP 100 and the PC 200 and between the MFP 100 and the log collection server 300 and registration identification information on the MFP 100 is registered in the log collection server 300. Further, at this time, based on agreement of a user, a registration procedure of a service the user subscribes as well as a mail address, a telephone number, and so on of the user is performed. As described above, by registering the registration identification information on the MFP 100 in the log collection server 300, the MFP 100 and the log collection server 300 enter the associated state and the state where both can communicate with each other is brought about.

After this, in the case where a print job is performed, an ink tank is exchanged, and so on in the MFP 100, the MFP 100 generates and stores log information. Then, the MFP 100 transmits the stored log information to the log collection server 300 via the communication network 400.

In the present embodiment, the MFP 100 functions as an image forming apparatus, the PC 200 functions as an information processing apparatus, and the log collection server 300 functions as a server apparatus. Further, for the communication between the MFP 100 and the log collection server 300 and the communication between the MFP 100 and the PC 200, it is assumed that a communication protocol, such as HTTP and XMPP, is used as an example in the following. In addition, for the control protocol, it is assumed that a publicly known method is used.

Figure 2:
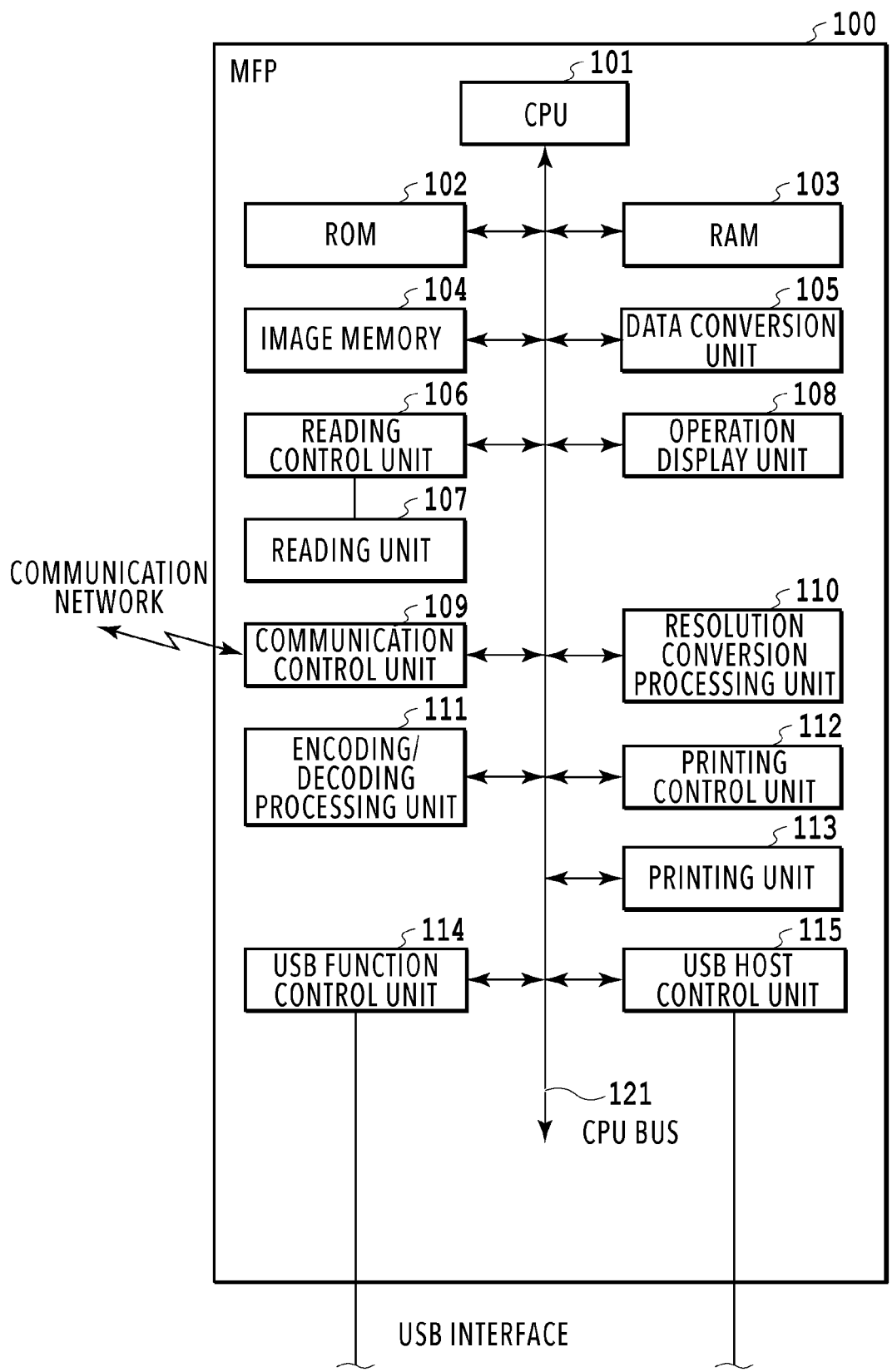
FIG. 2 is a block diagram showing a configuration of an image forming apparatus according to an embodiment of the present invention.

FIG. 2 is a block diagram showing a configuration of the image forming apparatus (MFP 100) according to the embodiment of the present invention. A CPU (Central Processing Unit) 101 is a system control unit of the MFP 100 and controls the entire MFP 100. The CPU 101 performs predetermined calculation, determination, and control processing (for example, storage control processing and the like) in accordance with programs stored in a ROM 102 and the like.

Specifically, the CPU 101 functions as a log information generation unit configured to generate an event of the MFP 100 as log information. Further, the CPU 101 functions as a log information deletion unit configured to delete log information stored in a RAM 103 so that the number of pieces of log information stored in the RAM 103 becomes less than a storage upper limit in the case of determining that the number of pieces of log information stored in the RAM 103 is larger than or equal to the storage upper limit. Furthermore, the CPU 101 functions as a log loss information addition unit configured to add log loss information indicating that log information has been lost (deleted) to the log information to be stored in the RAM 103 in the case where the log information stored in the RAM 103 is deleted.

The ROM (Read Only Memory) 102 stores fixed data, such as control programs executed by the CPU 101, a data table, and a built-in operating system (OS) program. Each control program stored in the ROM 102 includes one that performs software execution control, such as scheduling, task switch, and interrupt processing, under management of the built-in OS stored in the ROM 102.

The RAM (Random Access Memory) 103 includes an SRAM (Static Random Access Memory) and the like requiring a backup power source. In the RAM 103, data is stored by a primary battery for data backup, not shown schematically, and therefore, it is possible to store a program control variable and the like without volatilization. Further, although explanation will be given later by using FIG. 9 and the like, in the RAM 103, a memory area is also provided for storing log information in the case where it is not possible to send the log information to the log collection server 300, such as the case where there is no connection with the Internet. That is, the RAM 103 functions as a log information storage unit. In addition, a memory area for storing a plurality of pieces of information made use of by the registered service is also provided.

An image memory 104 includes a DRAM (Dynamic Random Access Memory) and the like and accumulates image data. Further, a part of an area is secured as a work area for execution of software processing. A data conversion unit 105 performs an analysis of a page description language (PDL) and the like, and conversion of image data, such as CG (Computer Graphics) development of character data.

A reading control unit 106 causes a reading unit 107 to optically read a document by an image sensor, such as a CIS, under control of the CPU 101. Then, the reading control unit 106 converts the electric image data that is read into an image signal and outputs highly accurate image data by performing various kinds of image processing, such as binarization processing and halftone processing, via an image processing control unit, not shown schematically.

The reading of a document by the reading control unit 106 and the reading unit 107 may be performed by one of two control methods below. A first method is a sheet reading control method in which a document is read by a fixed CIS image sensor while conveying the document. Further, a second method is a book reading control method in which a document fixed on a document table is scanned by a moving CIS image sensor.

An operation display unit 108 includes required minimum keys, such as a numerical value input key, a mode setting key, a determination key, and a cancel key, an LED (Light Emitting Diode), an LCD (Liquid Crystal Display), and so on, and is used at the time of activating various functions as an MFP. As to the LCD, the CPU 101 turns off the backlight of the LCD for reducing power consumption in the case where a print job or a scan job is not being performed and a general user does not perform any operation for a predetermined period of time.

Although described later by using FIG. 6A, FIG. 6B, and FIG. 7, in the present embodiment, a log accumulation warning screen is displayed (that is, to warn and notify that logs are accumulated) on the operation display unit 108 based on a plurality of pieces of information stored in the RAM 103 and made use of in the registered service.

A communication control unit 109 connects to a communication network and performs connection to the Internet provider and communication of data, such as log information, with the log collection server 300. Further, the communication control unit 109 is capable of determining whether the MFP 100 is connected to the Internet or connected only to a LAN. For the connection to a communication network, it is assumed that a publicly known method, such as HTTP and XMPP, is used and here, explanation thereof is omitted.

A resolution conversion processing unit 110 performs resolution conversion control, such as mutual conversion of millimeter-system image data and inch-system image data. In the resolution conversion processing unit 110, it is also possible to perform enlargement/reduction processing of image data.

An encoding/decoding processing unit 111 mutually performs encoding/decoding processing, enlargement/reduction processing, and so on for image data (non-compression, MH, MR, MMR, JBIG, JPEC, and so on) handled in the MFP 100. A printing control unit 112 converts image data to be printed into highly accurate image data by performing various kinds of processing, such as smoothing processing, print density correction processing, and color correction, for the image data via an image processing control unit, not shown schematically, and outputs the image data to a printing unit 113. Further, the printing control unit 112 periodically acquires state information data of the printing unit 113 by controlling a USB host control unit 115.

The printing unit 113 is a printing unit including a laser beam printer, an ink jet printer, and so on, and prints color image data or monochrome image data generated by the printing control unit 112 on a print member.

A USB function control unit 114 performs communication control of a USB interface and performs protocol control in accordance with the USB communication standard. Specifically, the USB function control unit 114 converts data from a USB function control task performed by the CPU 101 into a packet and transmits a USB packet to the PC 200. Further, the USB function control unit 114 converts a USB packet received from the PC 200 into data and transmits the data to the CPU 101.

The USB host control unit 115 is a control unit configured to perform communication by a protocol determined by the USB communication standard. The USB communication standard is a standard that enables high-speed bidirectional data communication and it is possible to connect a plurality of hubs or functions (slaves) to one host (master). The USB host control unit 115 has the function of the host in USB communication. Of the above-described blocks (components), the blocks indicated by symbols 101 to 106 and 108 to 115 are connected to one another via a CPU bus 121.

Figure 3:
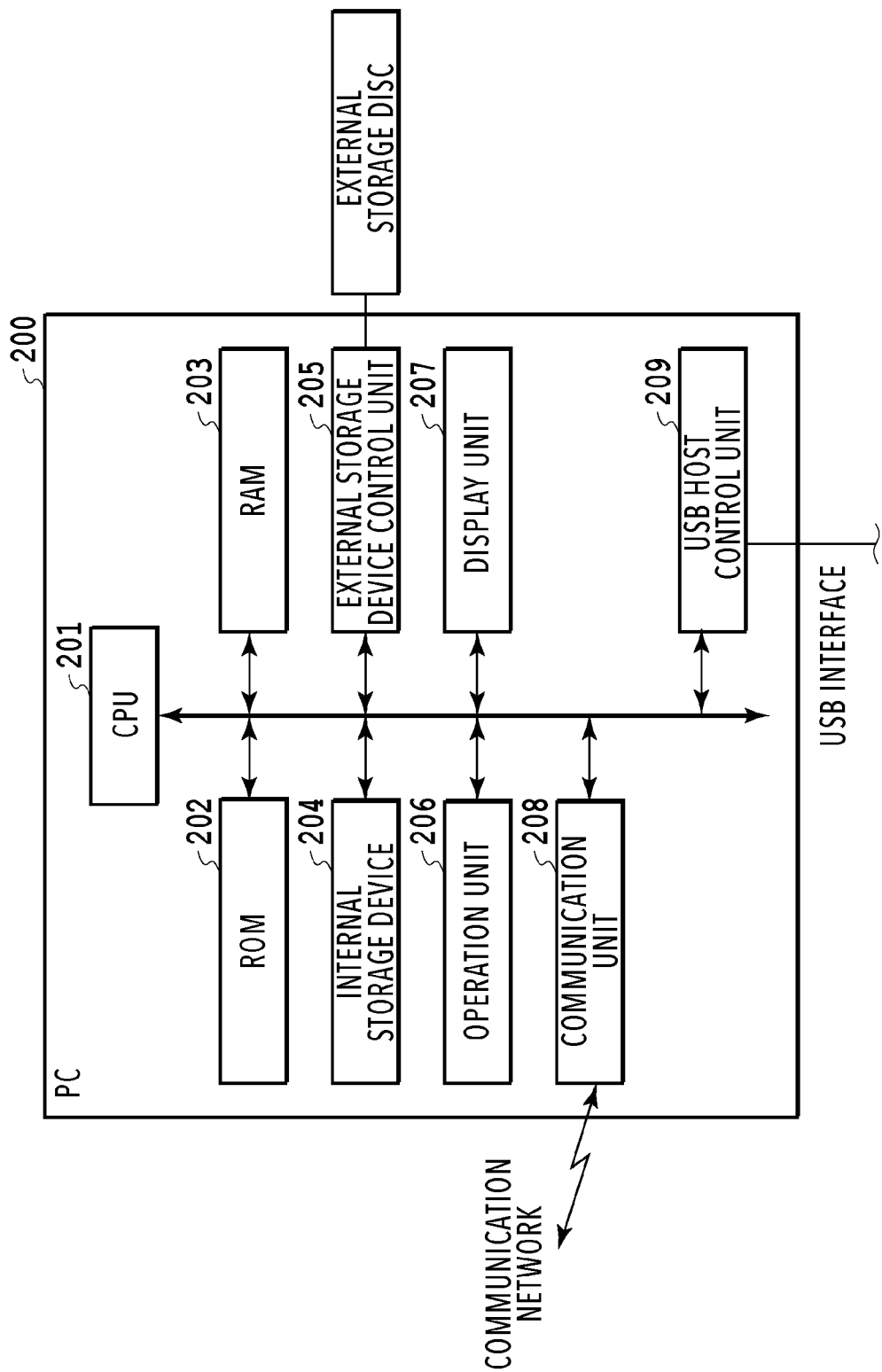
FIG. 3 is a block diagram showing a configuration of an information processing apparatus according to an embodiment of the present invention.

FIG. 3 is a block diagram showing a configuration of the information processing apparatus (PC 200) according to the embodiment of the present invention. A CPU 201 controls the operation of the entire PC 200 via a system bus in accordance with programs read from a ROM 202, a RAM 203, an internal storage device 204, or from an external storage device by an external storage device control unit 205.

The ROM 202 stores control programs and the like of the CPU 201. The RAM 203 is mounted to temporarily store programs and image data and to cause the processing of the PC 200 to be performed at a high speed. Further, the RAM 203 is also used to store log information copied from the MFP 100 in the present embodiment.

The internal storage device 204 stores an operating system, various application programs, image data, and so on. Normally, these application programs are installed by the data thereof being read from an external storage device (computer readable medium/external storage disc (such as CD/DVD media)) and being controlled in the external storage device control unit 205.

An operation unit 206 controls a keyboard and a mouse (not shown schematically) as a unit configured to input instructions from a user. A display unit 207 displays various displays for a user. A communication unit 208 connects to a communication network and performs connection to the Internet provider and data communication with a log collection server 300. A USB host control unit 209 is a control unit configured to perform communication by a protocol determined by the USB communication standard and is used for connection with the MFP 100 and copying of log information or the like is performed.

Figure 4:
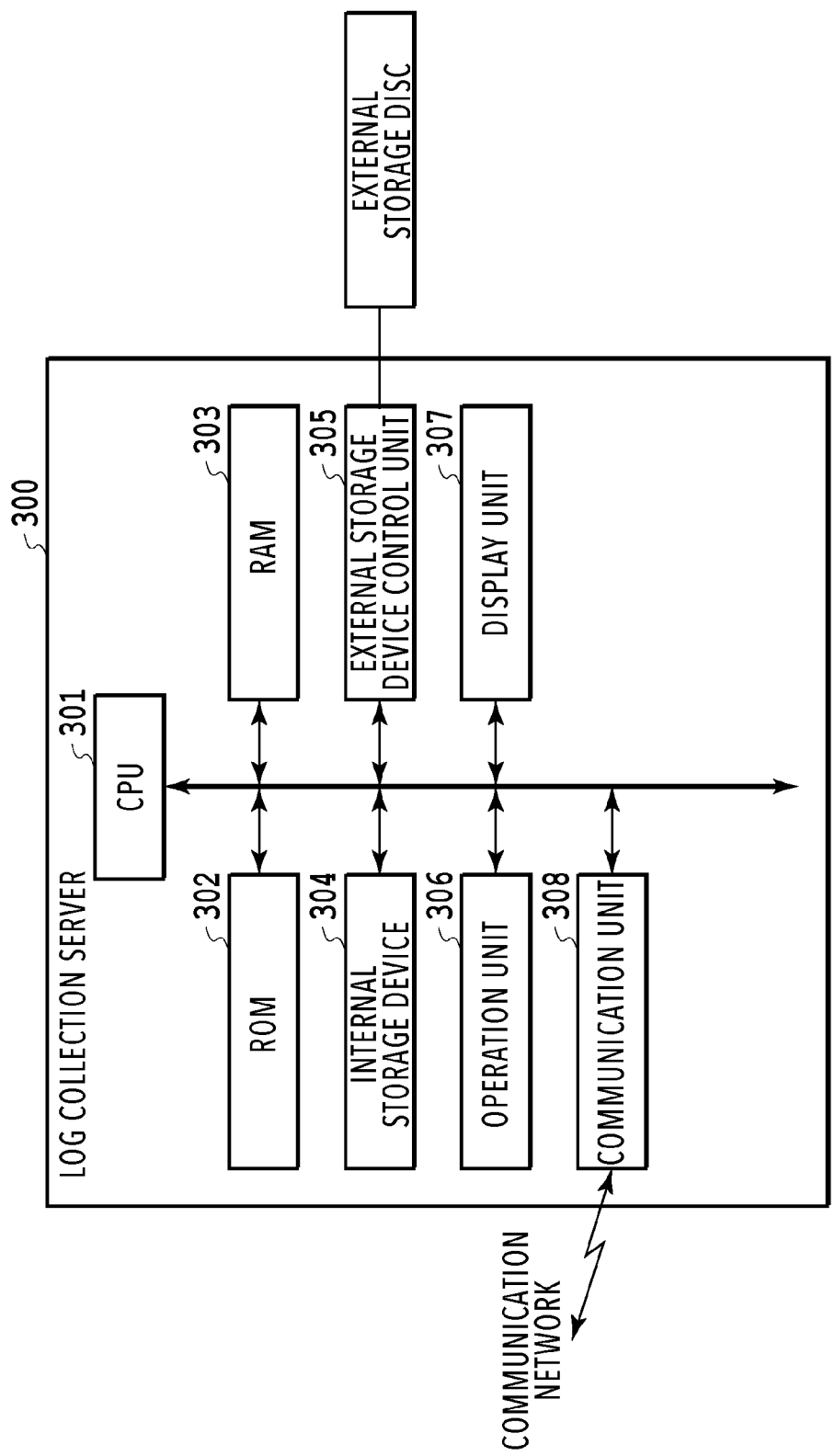
FIG. 4 is a block diagram showing a configuration of a sever apparatus according to an embodiment of the present invention.

FIG. 4 is a block diagram showing a configuration of the server apparatus (log collection server 300) according to the embodiment of the present invention. A CPU 301 controls the operation of the entire log collection server 300 via a system bus in accordance with programs read from a ROM 302, a RAM 303, an internal storage device 304, or from an external storage device by an external storage device control unit 305. As will be described later by using FIG. 5A and FIG. 5B, the CPU 301 functions, for example, as a log information analysis unit configured to analyze log information received from the MFP 100.

The ROM 302 stores control programs and the like of the CPU 301. The RAM 303 is mounted to temporarily store programs and data and to cause the processing of the log collection server 300 to be performed at a high speed.

The internal storage device 304 stores an operating system, various application programs, image data, and so on. Normally, these application programs are installed by the data thereof being read from an external storage device (computer readable medium/external storage disc (such as CD/DVD media)) and being controlled in the external storage device control unit 305. Further, the RAM 303 or the internal storage device 304 functions as an identification information storage unit configured to store registration identification information on the MFP 100, and the like.

An operation unit 306 controls a keyboard and a mouse (not shown schematically) as a unit configured to input instructions from an operator. A display unit 307 displays various displays for an operator. A communication unit 308 connects to a communication network and performs connection to the Internet provider and data communication with the MFP 100 and the PC 200. The communication unit 308 functions as a log information reception unit configured to receive log information transmitted from the MFP 100. Further, for the connection to a communication network, it is assumed that a publicly known method, such as HTTP and XMPP, is used and here, explanation thereof is omitted.

Figure 5B:
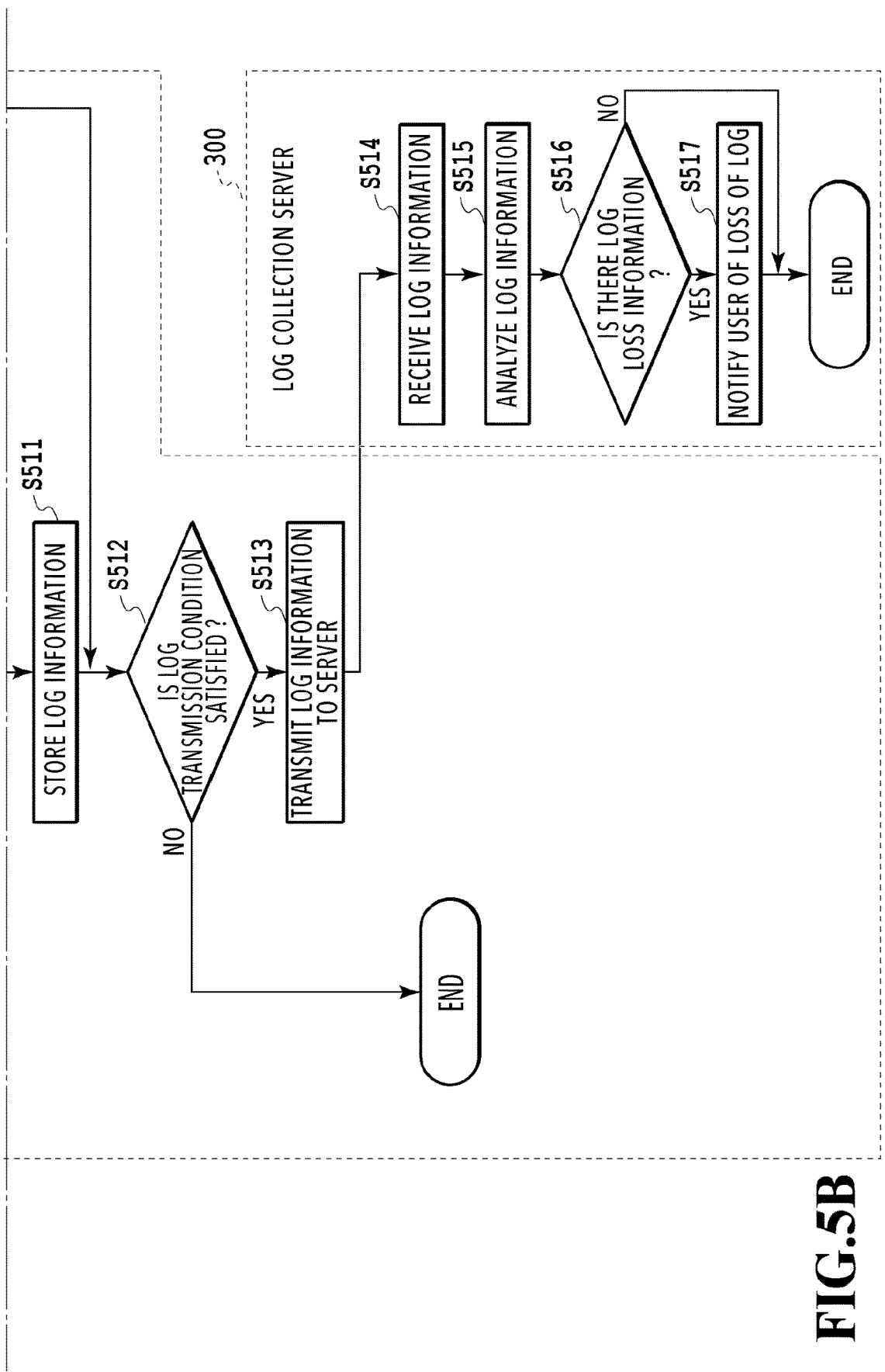
FIG. 5B is a sequence diagram showing a procedure of processing of an MFP and a log collection server.

FIG. 5A and FIG. 5B are sequence diagram showing a procedure of processing of the MFP 100 and the log collection server 300. The MFP 100 receives each event, such as a print job issued by a user operating an external terminal or the MFP 100 and giving instructions as to printing and copying and an ink tank exchange job issued by an ink tank being exchanged, as log information (S501). Here, this event also includes an event, such as an idle event issued in the state where no processing is being performed (idle state) in the MFP 100.

The MFP 100 determines whether or not the received log information is log information to be stored in the case of receiving provision of a registered service (S502). At this time, whether or not the received log information is log information to be stored is different according to the subscribed (registered) service. Consequently, for example, there is a service that takes log information relating to a print job event and an ink exchange event as a storage target but does not take an idle event as a storage target, or a service whose targets to be stored are different for different print contents despite the same print job event.

In the case where the log information is determined to be a storage target at step S502, whether the number of pieces of log information stored in the storage unit exceeds the storage upper limit (that is, whether the number becomes larger than the storage upper limit) by storing the log information in the storage unit of the MFP 100 is determined. For example, in the case where the storage upper limit is 200, whether or not the number exceeds 200 due to the log information of this time is determined (S503). In the case where the log information is determined to be a target not to be stored at step S502, the MFP 100 advances the processing to step S512.

In the case where it is determined that the number of pieces of log information stored in the storage unit does not exceed the storage upper limit (that is, in the case where it is determined that the number is less than or equal to the storage upper limit) at step S503, whether or not the number of pieces of log information reaches the storage upper limit of log is determined (S504). That is, whether or not the number of pieces of log information becomes equal to the storage upper limit of log is determined.

Then, in the case where it is determined that the number of pieces of log information reaches the storage upper limit of log (S504 Yes), a log reaching warning screen (that is, a screen for warning that the number of logs reaches the storage upper limit) is displayed on the display operation unit of the MFP 100 (S505). After displaying the log reaching warning screen (S505), the MFP 100 stores the log information received at step S501 in the storage unit of the MFP 100 (S511).

Further, in the case where it is determined that the number of pieces of log information does not reach the storage upper limit of log at step S504, whether or not the number of pieces of log information is approaching the storage upper limit of log is determined (S506). As the determination of whether the storage upper limit number is being approached, specifically, a number (threshold value) smaller than the storage upper limit by a predetermined number is determined in advance and whether or not the number of pieces of log information reaches the threshold value (that is, whether or not the number becomes larger than or equal to the threshold value) is determined.

Then, in the case where it is determined that the number of pieces of log information is approaching the storage upper limit of log (S506 Yes), a log accumulation warning screen (that is, a screen for notifying that a large number of pieces of log information have accumulated) is displayed on the display operation unit of the MFP 100 (S507). After displaying the log accumulation warning screen, the MFP 100 prompts a user to connect the MFP 100 to the Internet (that is, prompts a user to bring about an environment in which log information can be transmitted to the log collection server 300). Further, the log accumulation warning screen notifies a user that log information cannot be transmitted to the log collection server 300 and the number of pieces of log information is approaching the storage upper limit, and that the service making use of log information cannot be received any more.

After displaying the log accumulation warning screen (S507), the MFP 100 stores the log information received at step S501 in the storage unit of the MFP 100 (S511). In the case where it is determined that the number of pieces of log information is not approaching the storage upper limit of log (S506 No), the MFP 100 advances the processing to step S511 and stores the log information received at step S501 in the storage unit of the MFP 100 (S511).

Further, in the case where it is determined that the number of pieces of log information stored in the storage unit exceeds the storage upper limit (that is, in the case where the number becomes larger than the storage upper limit) at step S503, the MFP 100 deletes the oldest log information of the stored log information (S508). At the time of deleting the oldest log information, stopping the function of the MFP 100 (that is, limiting the function of the MFP 100) or the like is not performed. Further, in the present embodiment, the specifications are such that the oldest log information of the stored log information is deleted, but it may also be possible to delete log information according to the data size and the like of the log information. Specifically, it may also be possible to delete log information whose data size is large.

After deleting the oldest log information (S508), the MFP 100 adds log loss information to the log information (S509) and displays a log loss warning screen for notifying a user that the log information has been lost on the display operation unit of the MFP 100 (S510). The log loss warning screen here is different from the log reaching warning screen displayed at step S505 and the log accumulation warning screen displayed at step S507. Here, for example, "The log information has been deleted because the number of logs exceeds 200. Because of this, the service provision will be impeded. Check the network situation of the MFP" or the like is displayed. After displaying the log loss warning screen, the MFP 100 stores the log information to which the log loss information is added in the storage unit of the MFP 100 (S511).

After storing the log information (S511), the MFP 100 determines whether or not to transmit the log information to the log collection server 300 (S512). The determination of whether or not to transmit the log information to the log collection server 300 is performed based on the contents of the event received at step S501 and in addition thereto, the situation and the like of the network of the MFP 100.

In the case of determining to transmit the log information at step S512, the MFP 100 transmits the registration identification information in association with the accumulated log information to the log collection server 300 by using the communication control unit of the MFP 100 (S513). In the case where the number of accumulated logs is large, there is a case where the logs are divided into a plurality of groups and then each group is transmitted.

Upon receipt of the registration identification information and the log information from the MFP 100 (S514), the log collection server 300 checks the registration situation of the MFP 100 from the registration identification information and analyzes the log information (S515). The log collection server 300 further determines whether or not log loss information is included in the log information (S516). In the case where the results of the determination indicate that log loss information is included, the log collection server 300 also analyzes the number of pieces of log loss information and the date and time of the lost log information, and further, finds information relating to a user, including the user's contact address and the like, from the registration identification information.

Then, in the case where log loss information is included, the log collection server 300 notifies the user that part of the log information has been lost and the service making use of the log information is affected by using a mail, a telephone, and so on (S517). Further, at this time, the log collection server 300 prompts the user to check the network situation and the like of the MFP 100.

In addition, the log collection server 300 estimates the cause of the loss of the log from the date and time of the lost log information, for example, by performing collation with information relating to the environment on the service provision side, such as server down, or the environment on the user side. Then, based on the cause and the type of the service, the log collection server 300 estimates the contents and amount of the service that the user cannot receive from the lost log information and additionally provides the estimated service to the user, and thereby, compensates for the service. In the case where it is determined that log loss information is not included in the log information at step S516, the processing shown at step S517 is not performed and the processing shown in FIG. 5A and FIG. 5B is terminated.

FIG. 6A and FIG. 6B are diagrams showing the log accumulation warning screens displayed in the case where the number of pieces of log information is approaching the storage upper limit. This log accumulation warning screen is the warning screen displayed at step S507 in the case where it is determined that the number of pieces of log information is approaching the storage upper limit at S506 in FIG. 5A. This screen is displayed for notifying a user that the storage upper limit is being approached in the case where the number of accumulated pieces of log information reaches a predetermined threshold value.

As described above, in order to warn a user stepwise, it is possible to set a plurality of threshold values for the storage upper limit of log information, and in the case where the number of accumulated pieces of log information reaches each threshold value, a log accumulation warning screen assigned to each threshold value is displayed. FIG. 6A shows the case where the threshold value is set to 100 and FIG. 6B shows the case where the threshold value is set to 180, respectively.

It is possible for a user to close (cancel) the log accumulation warning screen by pressing down an OK button on the log accumulation warning screens shown in FIG. 6A and FIG. 6B. However, there is a user who intentionally uses the MFP 100 offline, having an awareness that log information accumulates. For such a user, it is possible to issue a job to the MFP 100 from an external terminal and the like even though this warning screen is not canceled. Further, it is possible to cause the MFP 100 to perform processing in accordance with an issued job without limiting the function thereof. The MFP 100 continues to display the warning screen after performing the job unless a user cancels the log accumulation warning screen.

FIG. 7 is a diagram showing the log reaching warning screen displayed in the case where the number of pieces of log information reaches the storage upper limit. This log reach warning screen is the warning screen displayed at step S505 in the case where it is determined that the number of pieces of log information reaches the storage upper limit at S504 in FIG. 5A. This warning screen is displayed for notifying a user that log information will be lost after this and it is no longer possible to receive the service corresponding to the lost information in the case where the number of accumulated pieces of log information reaches the storage upper limit (that is, the number becomes equal to the storage upper limit). That is, log information that causes the number of pieces of log information to exceed the storage upper limit is not stored.

For the log reaching warning screen shown in FIG. 7 also, like the log accumulation warning screens shown in FIG. 6A and FIG. 6B, it is possible for a user to cancel the log reaching warning screen by pressing down an OK button. However, there is a user who intentionally uses the MFP 100 offline, having an awareness that log information accumulates. For such a user, it is possible to issue a job to the MFP 100 from an external terminal and the like even though this warning screen is not canceled and further, it is possible to cause the MFP 100 to perform processing in accordance with an issued job without limiting the function thereof. The MFP 100 continues to display the warning screen after performing the job unless a user cancels the log reaching warning screen.

FIG. 8 is a diagram showing log information not including log loss information. In the case where an event that is a target of storage occurs, the MFP 100 generates information by associating the date and time of occurrence thereof and the event contents with the registration identification information issued from the log collection server 300 at the time of registration as log information.

In the case where it is not possible to communicate with the log collection server 300, and the like, the MFP 100 stores the log information in the RAM 103 until the storage upper limit is reached. In the case where the number of pieces of log information is less than or equal to the storage upper limit, overwriting of the log information does not occur, and therefore, the MFP 100 stores the log information without adding log loss information. Due to this, in the case where the log collection server 300 receives this log information, it is possible for the log collection server 300 to determine that the log information is not lost because log loss information is not added to the log information.

FIG. 9 is a diagram showing log information including log loss information. In the case where a storage-target event occurs, the MFP 100 generates information by associating the date and time of occurrence thereof and the event contents with the registration identification information issued from the log collection server 300 at the time of registration as log information.

In the case where it is not possible to communicate with the log collection server 300, and the like, the MFP 100 stores the log information in the RAM 103 until the storage upper limit is reached. FIG. 9 shows the case where overwriting of log information has occurred because the number of pieces of log information having occurred in the state where communication with the log collection server 300 cannot be performed exceeds the storage upper limit. In FIG. 9, information indicating that the log information is lost is added to new log information as log loss information along with the date and time of occurrence of the lost log information. Due to this, in the case where the log collection server 300 receives this log information, it is possible for the log collection server 300 to grasp that the log information has been lost and the date and time of occurrence of the lost log by the log loss information.

FIG. 10A and FIG. 10B are diagrams showing log information including log loss information. The log information shown in FIG. 10A and FIG. 10B also includes partial information and state information (lost log status information) relating to the lost log information, in addition to the log loss information. Due to this, it is possible for the log collection server 300 to determine the service contents to be compensated for from the partial information and the lost log status information even in the case where the log information has been lost. For example, in the case where priority is given to the number of printed sheets over the kind of sheet as to a certain service, by storing this as partial information by giving priority to the number of printed sheets over the kind of sheet, it is possible to further improve the accuracy in the case of compensating for the service. That is, it is possible to acquire a higher point in FIG. 10A than in FIG. 10B.

Further, by storing lost log status information, it is possible for the log collection server 300 to analyze the reason for the loss, and to determine whether the cause is on the user side or on the service provision side and further to determine whether or not to compensate for the service and the contents of the service. Consequently, for example, in the case where log information is lost because the MFP 100 is not connected with an access point, measures are taken so that the cause is resolved. In addition, in the case where log information is lost by the server maintenance, the service equivalent to the service to be received including the partial information is compensated for as much as possible.

As described above, even in the case where the number of pieces of log information approaches the storage upper limit in the state where log information cannot be transmitted to the log collection server 300, it is possible to notify a user that the service making use of the log information is not received.

Further, even in the case where the number of pieces of log information exceeds the storage upper limit, it is possible to notify a user that the service making use of the log information is not received. Furthermore, in this case, by adding the fact that the log information has been lost to the log information as log loss information and transmitting the log information to the log collection server 300, it is possible to notify a user by using a method other than the notification by the display unit of the MFP 100. In addition, it is possible for the log collection server 300 to analyze the cause of not being capable of transmitting the log information and to compensate for the service not provided.

In the above-described embodiment, the example is shown in which a user is notified by using the display unit of the MFP 100 in the case of warning accumulation of log information, but it is also possible to give a remote notification using warning printing in the MFP 100 or the display unit of an external terminal.

Further, in the above-described embodiment, explanation is given by taking a telephone or a mail as a method of notifying a user that log information is lost from the log collection server 300, but the method is not necessarily limited to those and another method of notification may be used. Consequently, for example, it is possible for the log collection server 300 to transmit the fact that log information is lost to the MFP 100 as information and for the MFP 100 itself having received this to notify a user by using the display unit thereof. In addition, it is possible for an application installed in an external terminal to acquire information from the log collection server 300 and to display the information on the display unit of the external terminal. Alternatively, it may also be possible to notify a user by a service person directly visiting the installation place.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, even in the case where the number of pieces of log information approaches a storage upper limit, it is possible to prevent a reduction in usability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-129167, filed Jun. 30, 2017, which is hereby incorporated by reference wherein in its entirety.

What is claimed is:

1. An image forming apparatus that transmits log information, the image forming apparatus comprising:
    at least one processor configured to cause the image forming apparatus to act as:
    (1) an accepting unit configured to accept a job;
    (2) a log information generation unit configured to generate the log information in accordance with the job;
    (3) a storage control unit configured to cause a log information storage unit to store the generated log information;
    (4) a log information deletion unit configured to delete log information stored in the log information storage unit so that log information stored in the log information storage unit does not exceed a first threshold value;
    (5) a transmission unit configured to transmit the stored log information; and
    (6) a notification control unit configured to control a notification relating to a log information,
    wherein the notification control unit performs the notification relating to the log information in a case where the log information stored in the log information storage unit reaches a second threshold value that is less than the first threshold value, and
    wherein the accepting unit is able to accept a job even in a state where the log information stored in the log information storage unit has reached the second threshold value and the notification is performed.

2. The image forming apparatus according to claim 1, wherein the log information generation unit generates the log information even in the state where the log information stored in the log information storage unit has reached the second threshold value.

3. The image forming apparatus according to claim 1, wherein the notification control unit further performs a notification in a case where the log information stored in the log information storage unit reaches a third threshold value that is larger than the second threshold value and is less than the first threshold value.

4. The image forming apparatus according to claim 1, wherein in a case where the log information generation unit generates a first log information and log information stored in the log information storage unit exceeds the first threshold value if the first log information is stored, the log information deleting unit deletes second log information stored in the log information storage unit.

5. The image forming apparatus according to claim 4, wherein the notification control unit further performs a notification that a piece of the log information has been lost in a case where the log information has been lost.

6. An information processing system comprising:
(A) an image forming apparatus that transmits log information, the image forming apparatus comprising:
at least one processor configured to cause the image forming apparatus to act as:
(1) an accepting unit configured to accept a job;
(2) a log information generation unit configured to generate the log information in accordance with the job;
(3) a storage control unit configured to cause a log information storage unit to store the generated log information;
(4) a log information deletion unit configured to delete log information stored in the log information storage unit so that log information stored in the log information storage unit does not exceed a first threshold value;
(5) a transmission unit configured to transmit the stored log information; and
(6) a notification control unit configured to control a notification relating to a log information,
wherein the notification control unit performs the notification relating to the log information in a case where the log information stored in the log information storage unit reaches a second threshold value that is less than the first threshold value, and
wherein the accepting unit is able to accept a job even in a state where the log information stored in the log information storage unit has reached the second threshold value and the notification is performed; and
(B) a server apparatus comprising:
at least one processor configured to cause the server apparatus to act as:
a log information reception unit configured to receive the log information transmitted by the image forming apparatus.

7. The information processing system according to claim 6, wherein the log information generation unit generates the log information even in the state where the log information stored in the log information storage unit has reached the second threshold value.

8. The information processing system according to claim 6, wherein the notification control unit further performs a notification in a case where the log information stored in the log information storage unit reaches a third threshold value that is larger than the second threshold value and is less than the first threshold value.

9. The information processing system according to claim 6, wherein in a case where the log information generation unit generates a first log information and log information stored in the log information storage unit exceeds the first threshold value if the first log information is stored, the log information deleting unit deletes second log information stored in the log information storage unit.

10. The information processing system according to claim 9, wherein the notification control unit further performs a notification that a piece of the log information has been lost in a case where the log information has been lost.

11. The information processing system according to claim 6, wherein the server apparatus comprises an identification information storage unit configured to store identification information on the image forming apparatus in association with information on a user, and
wherein the notification unit notifies a terminal of a user associated with the identification information that the log information is lost.

* * * * *